Sept. 1, 1936.  F. S. LEE  2,052,885
RAKE
Filed Feb. 3, 1936
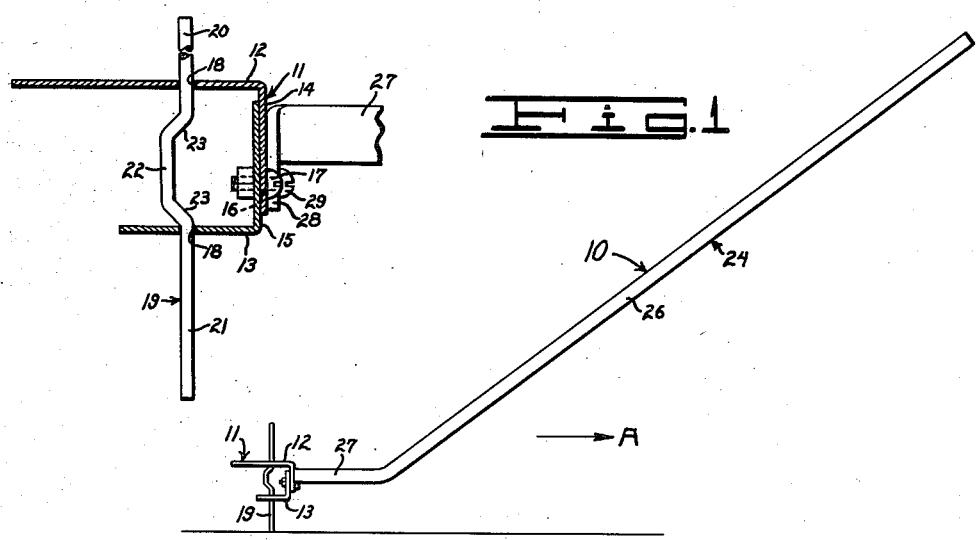
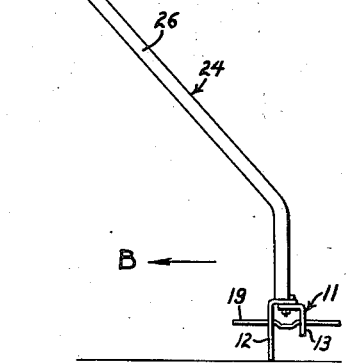
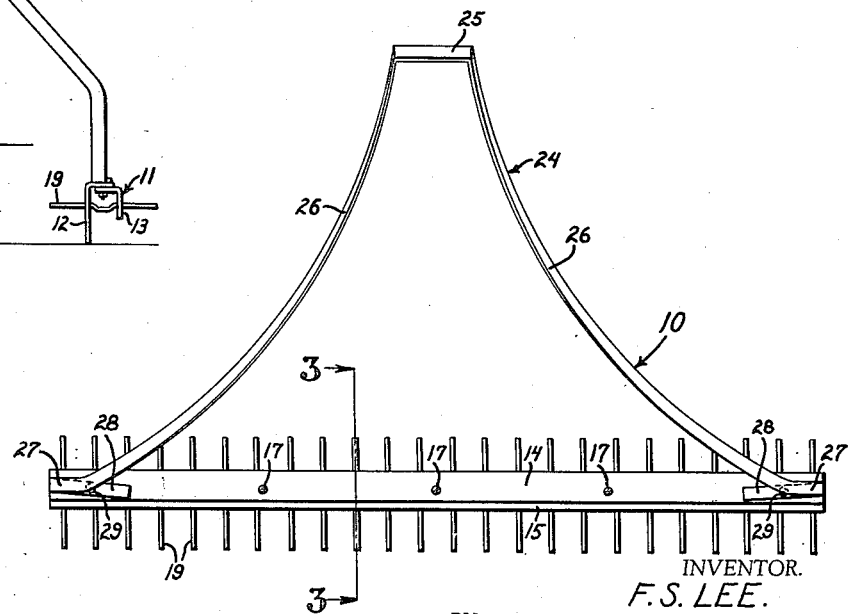
INVENTOR.
F. S. LEE.
BY
ATTORNEY.

Patented Sept. 1, 1936

2,052,885

UNITED STATES PATENT OFFICE 2,052,885

RAKE

Frederick S. Lee, Los Angeles, Calif., assignor of one-half to Christian H. Specht, Los Angeles, Calif.

Application February 3, 1936, Serial No. 62,143

7 Claims. (Cl. 55—10)

This invention relates to rakes.

The general object of the invention is to provide an improved rake which is particularly adapted for use in smoothing gravel and other materials in the paving at service stations.

Another object of the invention is to provide an improved rake including a body having a plurality of movable teeth thereon which are disposed to move towards and from the surface being raked when the rake is advanced over such surface to thereby tamp the surface.

Another object of the invention is to provide an improved rake including an upper and lower supporting portion and having novel teeth movably mounted therein.

Another object of the invention is to provide a rake including novel teeth which are movably mounted in a novel manner.

Other objects and the advantages of this invention will be apparent from the following description taken in connection with the accompanying drawing, wherein:

Fig. 1 is a side elevation of the rake embodying the features of my invention;

Fig. 2 is a front view of the rake;

Fig. 3 is a section taken on line 3—3 of Fig. 2; and

Fig. 4 is a side elevation of the rake showing it inverted as in the act of scraping.

Referring to the drawing by reference characters I have shown my invention as embodied in a rake which is indicated generally at 10. As shown the rake comprises a body 11 which includes an upper angle member 12 and a lower angle member 13. The angle member 12 is longer than the angle member 13. The legs 14 and 15 of the upper and lower angle members, respectively, are arranged in engaging relation and are provided with aligned apertures 16 through which bolts 17 are inserted to hold the legs together and hold the angle members in assembled relation.

The angle members 12 and 13 are provided with pairs of aligned apertures 18 which are disposed at substantially equal distance apart as shown.

In each pair of aligned apertures I arrange a tooth member 19. Each of these teeth is made of a length of metal rod and comprises an upper end portion 20 and a lower end portion 21. These end portions are coaxially arranged and are joined by an intermediate portion 22 which is formed by bending the tooth so that the intermediate portion is offset to provide shoulders 23. The distance between these shoulders is less than the distance between the upper and lower members. The apertures 18 are also of greater diameter than the rod from which the teeth 19 are made. As a result of this construction the teeth have limited up and down movement as well as being free to rotate.

A handle member is indicated generally at 24 and includes an end portion 25, curved divergent sides 26, and end portions 27. The end portions 27 are provided with tips 28 which are apertured to receive bolts 29 similar to the bolts 17 which pass through the apertures 16 in the overlapping ends of the rake to hold the handle in position.

The handle 24 is preferably formed in such a manner that when in an unstrained unassembled condition the legs 26 thereof are substantially parallel and are in a convenient shape for shipping and storing.

When the rake is assembled the legs 26 are spread apart as shown in Fig. 2 and secured in that position.

In raking, such as smoothing the gravel in a service station lot, the operator grasps the handle 24 and pulls the rake forward as indicated at A in Fig. 1. During this operation the teeth 19 engage the gravel or other material and smooth the same. When any embedded gravel is struck the teeth either dislodge such object or move bodily upward without disturbing the position of the teeth at either side of the obstruction. Further, as the rake is pulled the teeth move up and down forming a kind of tamping action so that the surface is hardened as well as smoothed.

For scraping purposes the rake is inverted as shown in Fig. 4 and pulled in the direction indicated at B and the edge of the longer angle acts as a shearing member to cut down any high points.

The legs 26 are resilient and when the rake is in operation if one end thereof strikes an obstruction the leg attached to that end flexes moving the rake body laterally and disengaging it from the obstruction.

As shown in the drawing, the teeth have the aligned end portions of the same length and when so made they can be reversed after those portions which engage the surface have been worn.

From the foregoing description it will be apparent that I have provided a novel rake which can be economically manufactured and which is highly efficient in use.

Having thus described my invention I claim:

1. In a rake, a body comprising an upper and a lower member, said upper and lower members having vertically aligned pairs of apertures therein, a tooth member mounted to slide freely in each pair of said apertures, means to limit the sliding movement of said tooth members and a handle member on said body.

2. In a rake, a body having apertures therein, teeth members mounted to slide freely in said apertures, each of said teeth comprising similar end portions and an intermediate portion which engages said body to limit the movement of the teeth.

3. In a rake, a body comprising an upper and a lower member, said upper and lower members having vertically aligned pairs of apertures therein, a tooth member inserted in each pair of said apertures, each of said teeth comprising end portions which are of less cross-sectional area than the area of the apertures and which are coaxially arranged and which pass through said aligned apertures and an intermediate portion which is offset with respect to said end portions, said intermediate portion being of less length than the distance between said legs whereby said teeth can rotate and shift axially, and a handle member on said body.

4. In a rake, a body comprising an upper angle member and a lower angle member, said members having vertical legs arranged adjacent each other, means connecting said legs, said upper and lower members having vertically aligned pairs of apertures therein, a tooth member inserted in each pair of said apertures, each of said teeth comprising end portions which are coaxially arranged and which pass through said aligned apertures and an intermediate portion which is offset with respect to said end portions, said intermediate portion being of less length than the distance between said legs whereby said teeth can shift, and a handle member on said body.

5. In a rake, a body comprising an upper angle member and a lower angle member, said members having vertical legs arranged adjacent each other, removable fastening means connecting said legs, said upper and lower members having vertically aligned pairs of apertures therein, a tooth member movably mounted in each pair of said apertures, each of said teeth comprising similar end portions, and an intermediate portion which is offset with respect to said end portions, said intermediate portion being of less length than the distance between said legs whereby said teeth can rotate and shift axially, and a handle member on said body.

6. In a rake, a body comprising an upper angle member and a lower angle member, said members having vertical legs arranged adjacent each other, threaded fastening means connecting said legs, said upper and lower members having vertically aligned pairs of apertures therein, a tooth member inserted in each pair of said apertures, each of said teeth comprising end portions which are of less cross-sectional area than the area of the apertures and which are coaxially arranged and which pass through said aligned apertures and an intermediate portion which is offset with respect to said end portions, said intermediate portion being of less length than the distance between said legs whereby said teeth can rotate and shift axially, said angle members having apertures therein adjacent each end thereof, and a handle member, said handle member having apertures therein and a bolt passing through said handle member apertures and through said body end apertures.

7. In a rake, a body comprising a body having a handle thereon, said body comprising upper and lower members having vertically aligned pairs of apertures therein, a tooth member inserted in each pair of said apertures, said upper member being longer than said lower member and having a scraping edge whereby the upper member serves as a scraper when the rake is inverted.

FREDERICK S. LEE.